United States Patent [19]

Rupert et al.

[11] Patent Number: 5,201,148

[45] Date of Patent: Apr. 13, 1993

[54] POLISHING BUSHING FOR POLISHING AN OPTICAL FIBER IN AN OPTICAL FIBER CONNECTOR

[75] Inventors: Martin R. Rupert, Hummelstown; Donald W. Thompson, Mechanicsburg, both of Pa.

[73] Assignee: AMP Incorporated, Harrisburg, Pa.

[21] Appl. No.: 859,178

[22] Filed: Mar. 27, 1992

[51] Int. Cl.$^5$ ..................... B24B 41/06; B24B 13/005
[52] U.S. Cl. ............................... 51/217 R; 51/216 R
[58] Field of Search ............ 51/217 R, 217 L, 217 P, 51/216 R, 216 LP, 216 P, 277, 4, 283 R, 283 E

[56] References Cited

U.S. PATENT DOCUMENTS

| | | | |
|---|---|---|---|
| 264,877 | 9/1982 | Heyer | 51/217 P |
| 3,975,865 | 8/1976 | Lewis | 51/170 T |
| 4,178,722 | 12/1979 | Forman et al. | 51/170 T |
| 4,240,230 | 12/1980 | Ferrantini | 51/168 |
| 4,272,926 | 6/1981 | Tamulevich | 51/216 R |
| 4,291,502 | 9/1981 | Grimsby et al. | 51/120 |
| 4,330,965 | 5/1982 | Clark | 51/217 R |
| 4,492,060 | 1/1985 | Clark | 51/283 R |
| 4,498,260 | 2/1985 | Doty | 51/217 R |
| 4,539,776 | 9/1985 | Weaver, Jr. | 51/217 R |
| 4,649,670 | 3/1987 | Snyder | 51/284 R |
| 4,693,035 | 9/1987 | Doyle | 51/277 |
| 4,711,053 | 12/1987 | Snyder | 51/3 |
| 4,776,136 | 10/1988 | Abendschein et al. | 51/216 R |
| 4,819,386 | 4/1989 | Struyf | 51/217 R |
| 5,018,316 | 5/1991 | Mulholland et al. | 51/217 R |

Primary Examiner—Robert A. Rose
Attorney, Agent, or Firm—Katherine A. Nelson; Driscoll A. Nina, Jr.

[57] ABSTRACT

A polishing bushing 24 for polishing by hand an end face 26 of an optical fiber supported in an alignment ferrule 34 of an optical fiber connector 20. The polishing bushing 24 comprises a body portion having one or more openings 61 extending therethrough from a front surface 52 to a rear surface 53 thereof to permit visual monitoring of a polishing operation as it is being performed, and securing means 62 for securing an optical fiber connector 20 to the bushing 24 to permit the end face 26 of an optical fiber supported in an alignment ferrule 34 thereof to be polished. The bushing body portion 51 preferably comprises an annular outer ring portion 54 connected to a central hub portion 56 by a plurality of radially extending spoke portions 57 to provide a plurality of arcuate openings 61 between the spoke portions 57. The polishing bushing 24 of the invention is light in weight, comfortable to grip and use and permits a polishing operation to be carried out in an efficient, controlled manner.

14 Claims, 5 Drawing Sheets

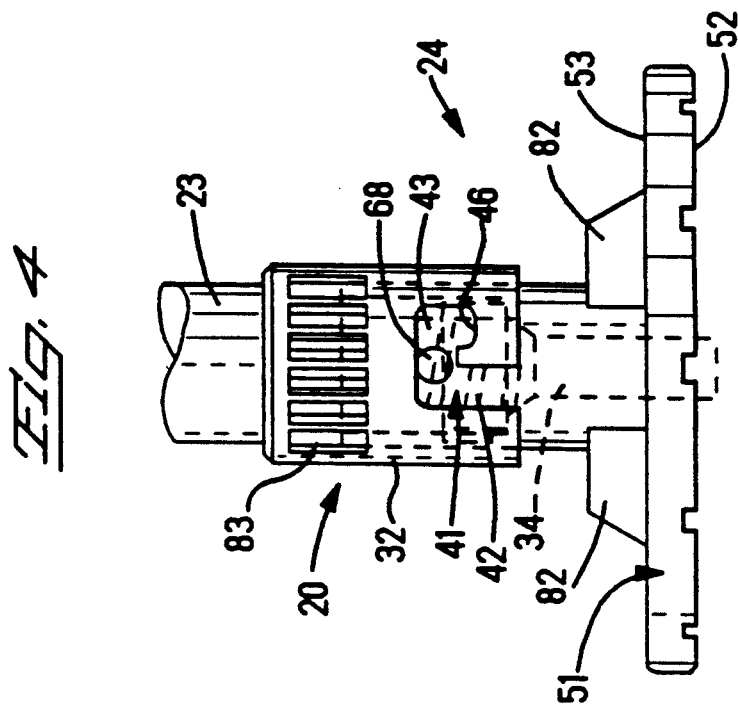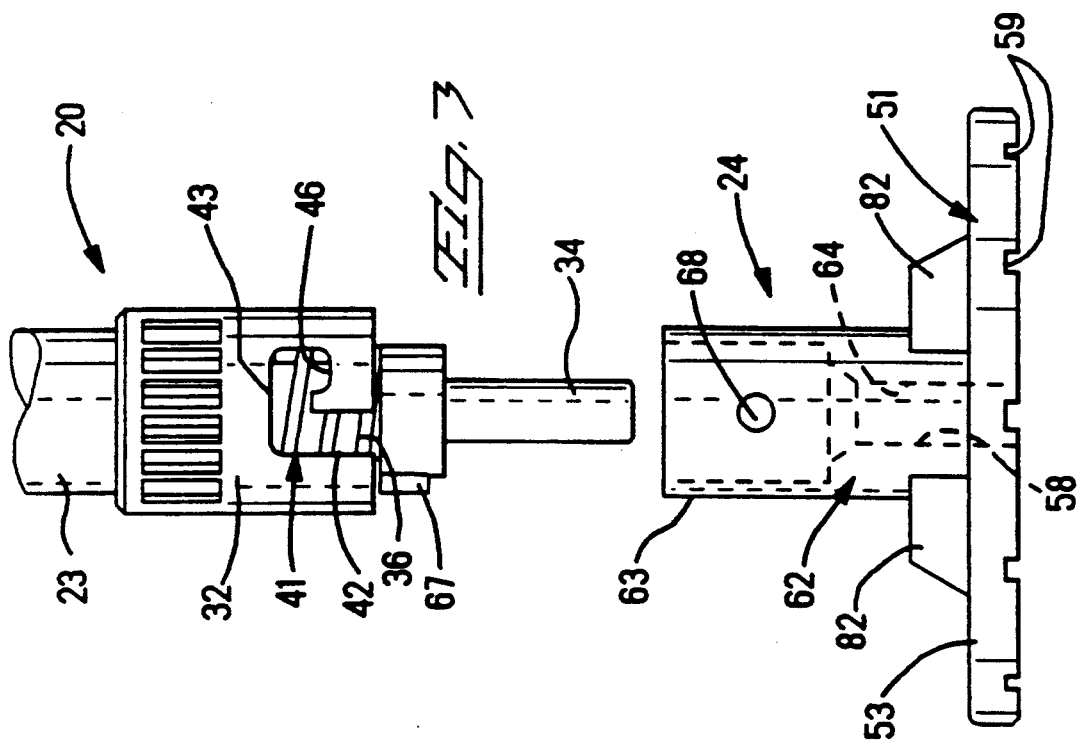

POLISHING BUSHING FOR POLISHING AN OPTICAL FIBER IN AN OPTICAL FIBER CONNECTOR

FIELD OF THE INVENTION

The present invention relates generally to a polishing tool; and, more particularly, to a polishing bushing for polishing the end face of an optical fiber in an optical fiber connector.

BACKGROUND OF THE INVENTION

It is desirable that the transfer of light between the optical fibers of mated optical fiber connectors be accomplished with a minimum loss of signal; i.e., with low insertion loss. Insertion loss may result from several factors, including the presence of a gap or separation between the ends of the connected fibers. Specifically, some light is lost if the end faces of two fibers are separated because light diverges as it radiates from the end of a fiber. In addition, fiber to fiber separation results in an insertion loss due to Fresnel reflections at the two glass-air interfaces between the spaced fibers. Accordingly, it is important that end faces of connected fibers be maintained in virtual contact with one another to minimize these losses.

Contact between the fibers of mated connectors is improved by polishing the fiber end faces. Typically, the end face of a fiber is polished by mounting a connector with protruding fiber to a polishing tool. The tool is then moved over a polishing medium by hand until the end face of the fiber is satisfactorily polished.

U.S. Pat. No. 5,018,316 discloses a polishing fixture particularly designed for polishing the end face of an optical fiber carried within a ceramic alignment ferrule of an optical fiber connector of the push-pull plug assembly type such as bayonet connector assembly. The polishing fixture of the patent comprises a body member having a front disk-shaped surface with a web of gutters formed therein. A profiled bore extends through the body member and is adapted to receive the front end of the ferrule having the optical fiber therein such that the end face of the ferrule extends slightly beyond the front surface of the polishing fixture. The fixture further includes means for attaching the fixture to an optical fiber connector of the push-pull plug assembly type.

As described in the patent, to polish the optical fiber of the connector, the fixture having the optical fiber connector attached thereto is grasped by hand and placed against a polishing medium. The end faces of the ferrule and of the optical fiber carried therein are then polished by moving the fixture in a figure eight pattern over the polishing medium. After polishing, the ceramic tip and fiber optic end face are observed under a microscope. An acceptable polished face will show fine polishing scratches, without any large pits although small peripheral chips may be permissible. If large chips appear in the center of the fiber, this means that further polishing is required or that the end face is unacceptable and the fiber must be re-terminated and repolished.

FIGS. 9 and 10 illustrate a known polishing bushing particularly designed for polishing the end face of an optical fiber carried in an alignment ferrule of an optical fiber connector of the bayonet lock type. The polishing bushing, which is generally designated by reference number 10, comprises a body portion 12 defining a disk-shaped front surface 13 having a web of gutters 14 formed therein. A central profiled bore 16 extends through the body portion 12 and is adapted to receive the end of an alignment ferrule carrying an optical fiber to be polished. The bushing further includes means 17 for securing the optical fiber connector to the bushing which comprises an annular alignment sleeve 18 extending rearwardly from the back face of the body portion 12. As shown in FIG. 10, a pair of diametrically opposed latching lugs 19 extend inwardly from the inner surface of the sleeve 18 for latching a bayonet lock type connector to the fixture.

In operation of the fixture of FIGS. 9 and 10, a bayonet lock type connector is inserted into the alignment sleeve and latched in place by the latching lugs such that the end of the alignment ferrule thereof and the optical fiber carried thereby extends through profiled bore 16 and protrudes slightly beyond the front surface 13 of the bushing. The bushing is then pressed lightly against the surface of a polishing medium and moved thereover by hand as described above until polishing is completed.

Although the polishing fixtures described in U.S. Pat. No. 5,018,316 and illustrated in FIGS. 9 and 10 of the present application are effective in polishing the end faces of optical fibers in a controlled, reliable manner; there is a need for a polishing bushing which will provide an operator with greater sensitivity of feel during the polishing operation and an ability to more closely monitor the polishing operation while it is being performed without removing the bushing from the polishing medium. It is also desirable to provide a polishing bushing that is light in weight, comfortable to hold and use and which provides a greater polishing speed.

SUMMARY OF THE INVENTION

The present invention provides a polishing bushing for polishing the end face of an optical fiber in an efficient and highly controllable manner.

A polishing bushing of the present invention is particularly designed for polishing an end face of an optical fiber supported in an optical fiber alignment ferrule and comprises a body member having a front surface and a rear surface and a bore extending therethrough in which an end of the alignment ferrule is to be disposed, and securing means for securing the ferrule to the body member for maintaining an end face of the ferrule and the end face of the optical fiber supported therein to be polished proximate the front surface of the body member, wherein the body member includes at least one opening extending therethrough from the front surface to the rear surface thereof to permit visual monitoring of a polishing operation therethrough.

In accordance with the present invention, the at least one opening functions as a window to permit an operator to visually monitor a polishing operation while it is taking place without removing the bushing from the polishing medium. In addition, the at least one opening results in a reduction of the area of the front surface of the bushing in contact with the polishing medium which facilitates the removal of debris generated during the polishing operation and the distribution of polishing liquid thereover. The at least one opening also results in a reduction in the overall weight of the bushing to make it easier to handle and use.

In accordance with a presently preferred embodiment, the at least one opening comprises a plurality of openings at spaced positions of the body member; and in accordance with a presently most preferred embodiment, the body member comprises a disk-shaped member having an outer annular ring portion, a central hub portion and a plurality of radially extending spoke portions connecting the central hub portion to the outer ring portion to define a plurality of arcuate openings between the spoke portions. A plurality of grooves or gutters are formed in the front surfaces of the outer annular ring portion and the spoke portions to assist in removing debris and to help distribute water or another polishing liquid during a polishing operation.

The securing means preferably includes an alignment sleeve extending rearwardly from the back surface of the disk-shaped member and includes means for attaching a fiber optic connector within which the alignment ferrule is incorporated to the bushing. In the presently preferred embodiment, the attaching means comprises bayonet lock type attaching means for securing a bayonet lock type connector to the polishing bushing.

The polishing bushing of the present invention also includes structure which provides an operator of the bushing with a more secure and comfortable grip of the bushing to provide the operator with greater sensitivity of feel during the polishing operation.

In general, the polishing bushing of the present invention provides enhanced control over a polishing operation and permits the end faces of optical fibers to be polished quickly and reliably.

Further advantages and specific details of the invention will become apparent hereinafter in conjunction with the following detailed description of a presently preferred embodiment.

BRIEF DESCRIPTION OF THE DRAWINGS

FIGS. 3, 4 and 5 are side views illustrating attachment of a bayonet lock type connector assembly to the polishing bushing of FIGS. 1 and 2;

DESCRIPTION OF A PREFERRED EMBODIMENT

A preferred embodiment of the invention is a one-piece molded polishing bushing for polishing a front end face of an optical fiber extending from the bore of an alignment ferrule of an optical fiber connector.

Figure 1:
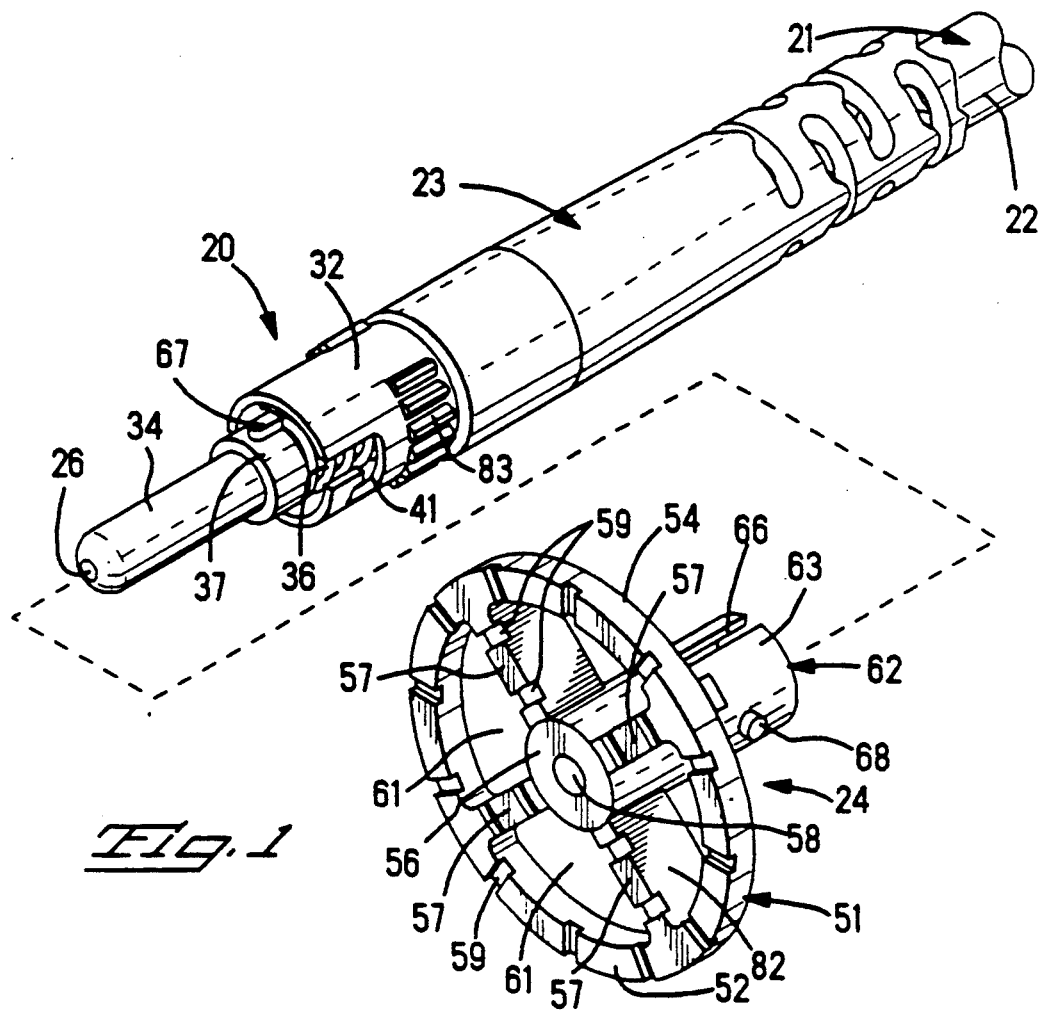
FIG. 1 is a perspective view, partially exploded, of a polishing bushing according to a presently preferred embodiment of the invention, and an optical fiber connector assembly usable therewith.

FIG. 1 illustrates an optical fiber connector assembly 20 assembled to the end of an optical fiber cable 21. The cable 21 is of conventional type and includes an elongated central optical fiber member concentrically encircled by a buffer to provide a buffer covered fiber. The buffer covered fiber, in turn, is surrounded by a load-bearing portion in the form of elongated strength members that extend lengthwise of the cable, and an outer jacket 22 of polymeric material surrounds the strength members and encloses the cable.

FIG. 1 also illustrates a tubular strain relief body 23 which encompasses the cable; and, as known to those skilled in the art, provides protection from overstressing the cable.

FIG. 1 also illustrates a polishing bushing 24 according to a presently preferred embodiment of the invention. As will be described hereinafter, the connector assembly 20 is adapted to be mounted to the bushing 24 to permit the end face 26 of the optical fiber extending thereinto from cable 21 to be polished.

Figure 6:
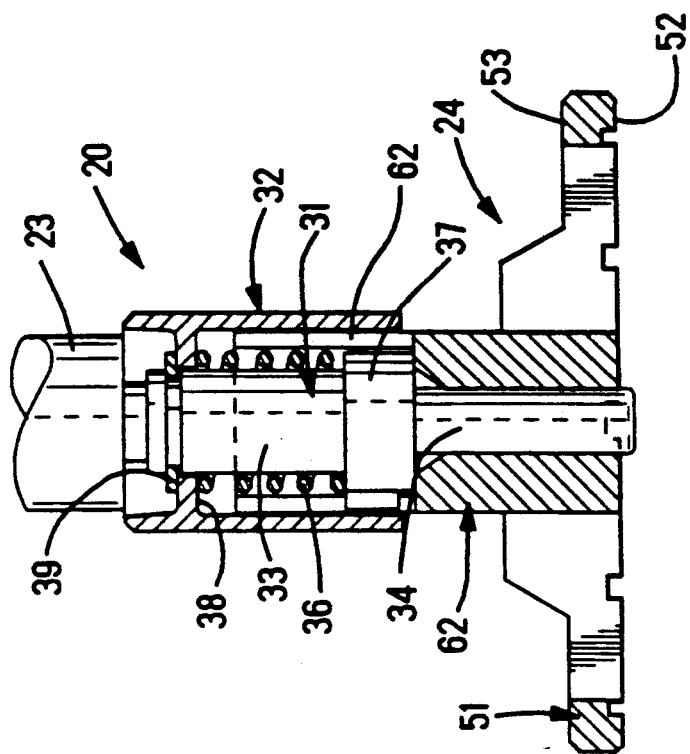
FIG. 6 is a view similar to FIG. 5, but in cross-section, to illustrate details of the polishing bushing and the connector assembly attached thereto.

As best shown in FIG. 6, the connector assembly 20 generally includes an inner cable-terminating portion 31 to which the end of the optical fiber cable 21 is attached, and an outer sleeve portion 32. The cable-terminating portion includes a tubular-shaped body portion 33 having a central bore for receiving a length of buffer covered optical fiber, and an alignment ferrule 34 of ceramic or other materials, such as metal or plastics, the ferrule 34 having a central bore for receiving a length of exposed optical fiber when the cable 21 is properly attached to the portion.

The outer sleeve portion 32 surrounds the body portion 33 of cable-terminating portion 31, and a coil spring 36 is positioned between the cable-terminating portion and the outer sleeve portion 32 and engages an enlarged diameter shoulder 37 on the cable-terminating portion and an inwardly extending annular flange 38 on the outer sleeve portion. The spring 36 biases the outer sleeve portion 32 upwardly relative to the cable-terminating portion such that flange 38 on the outer sleeve portion normally engages flange 39 on cable-terminating portion 31 as shown in FIG. 6. The spring, however, permits the outer sleeve portion 32 to be moved axially against the bias of the spring and to be rotated relative to the cable-terminating portion to connect and disconnect the connector assembly to a mating connector as known to those skilled in the art.

Figure 5:
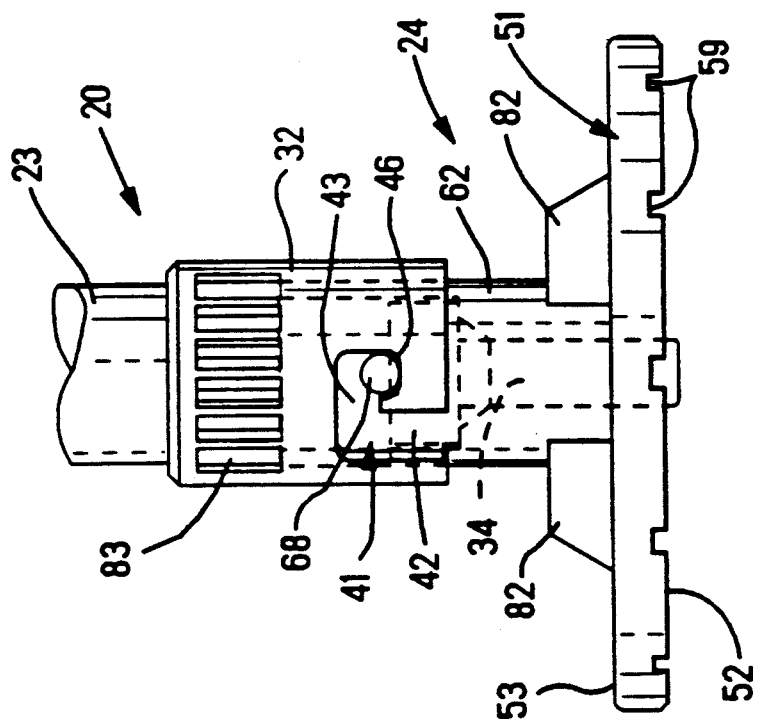

As best shown in FIGS. 3–5, outer sleeve portion 32 includes a pair of identical diametrically opposed latching slots 41 (only one is visible in the FIGS.) adapted to receive a pair of latching lugs on a mating connector to latch the connectors together. Slots 41 include an axial slot portion 42 and a lateral slot portion 43 as shown in the FIGS.

Figure 2:
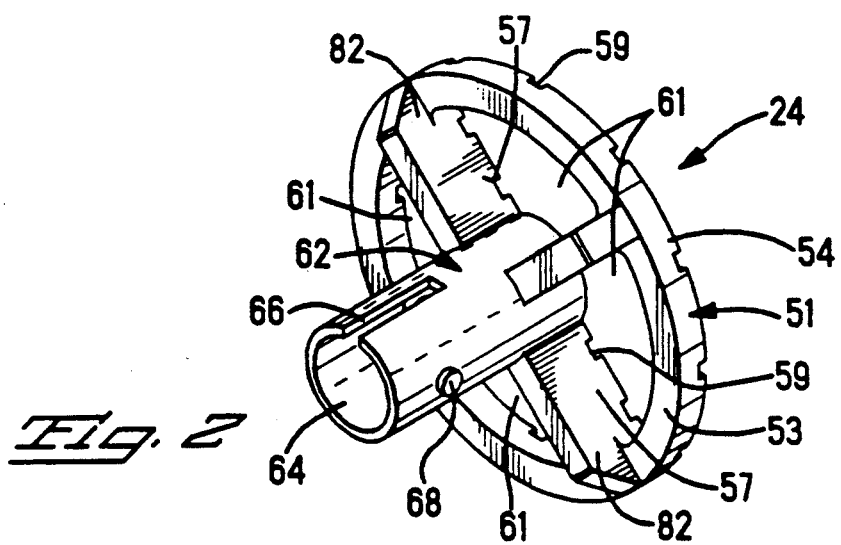
FIG. 2 is a perspective rear view of the polishing bushing of FIG. 1.

The polishing bushing 24 is best illustrated in FIGS. 1 and 2 and comprises a generally disk-shaped body 51. The disk-shaped body 51 includes a flat front surface 52 and a rear surface 53 and includes an outer annular ring-shaped portion 54, a central hub portion 56 and a plurality of radial spoke portions 57 connecting the ring-shaped portion 54 and the hub portion 56. The hub portion 56 has a central profiled bore 58 extending therethrough to receive alignment ferrule 34 carrying an optical fiber, the end face 26 of which is to be polished.

The front surface 52 of the polishing bushing is provided with a plurality of grooves or gutters 59 on the outer ring-shaped portion 54 and the radial spoke portions 57 for removing debris generated during a polishing operation and for distributing polishing liquid such as water, which is frequently used during a polishing operation. The plurality of spoke portions 57 are arranged generally perpendicular to one another and define therebetween a plurality of openings or windows 61 of generally arcuate shape. As will be described hereinafter, openings 61 permit the operator to view and monitor a polishing operation as it is taking place and provide additional advantages in using the polishing tool.

Polishing bushing 24 also includes a securing portion 62 for attaching the connector assembly 20 to the bushing. Securing portion 62 comprises an annular alignment sleeve 63 which extends rearwardly from the rear surface 53 of the disk-shaped body and includes a central bore 64 aligned with the profiled bore 58 of hub portion 56 for receiving the cable-terminating portion 31 of the connector assembly 20. Sleeve 63 also includes an axially extending slot 66 for receiving an alignment rib 67 on the cable-terminating portion of the connector, and a pair of diametrically opposed latching lugs 68 extending outwardly from a side surface thereof.

As shown in FIGS. 3-5, the connector assembly 20 is attached to the polishing bushing 24 by first inserting the cable-terminating portion of the connector assembly into the central bore 64 of the alignment sleeve 63. The alignment rib 67 on the connector assembly is aligned with the slot 66 on the sleeve 63 which, in turn, aligns the latching lugs 68 on the polishing bushing with the axial slot portions 42 of latching slots 41 on the outer sleeve portion 32 of the connector assembly. The operator then pushes down on the outer sleeve portion of the connector assembly against the bias of spring 36, such that the lugs 68 enter into and move up axial slot portions 42 into alignment with lateral slot portions 43 of latching slots 41. The outer sleeve portion is then rotated relative to the cable-terminating portion to cause lugs to enter into lateral slot portions 43 as shown in FIG. 4 and, after being fully rotated, the outer sleeve portion is released. The spring 36 then pushes the outer sleeve portion 32 upwardly causing the lugs to enter into recesses 46 in the lateral slot portions as shown in FIG. 5 to lock the connector assembly to the bushing.

When the connector assembly is attached to the bushing, the end of the alignment ferrule 34 will protrude from the profiled bore 58 in hub portion 56 of the bushing slightly beyond the front surface 52 of the bushing.

Figure 7:
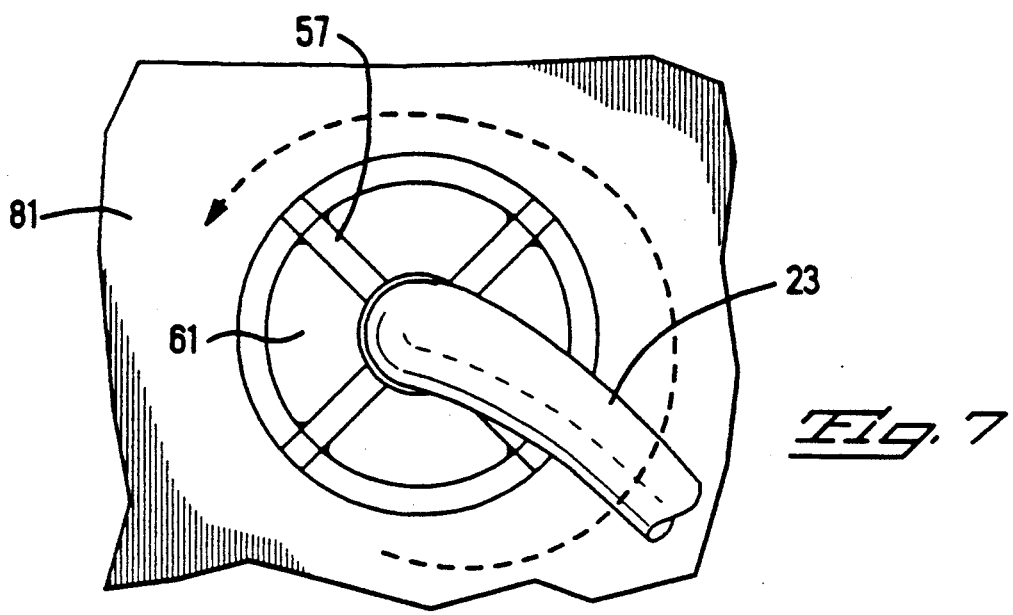
FIGS. 7 and 8 are top and side views, respectively, schematically illustrating the operation of the polishing bushing of the present invention.
Figure 8:
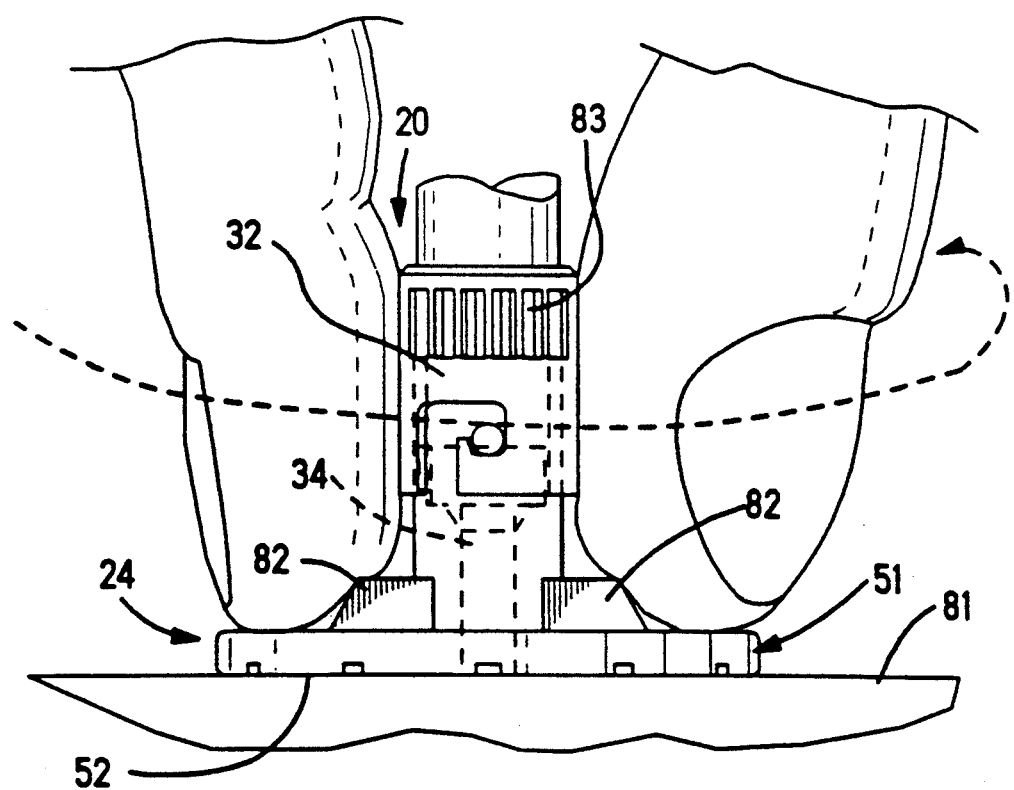

The polishing bushing 24 can now be used to polish the end face 26 of the optical fiber by hand as schematically illustrated in FIGS. 7 and 8. More particularly, the outer sleeve portion 32 of the connector assembly is grasped between the thumb and forefinger as shown in FIG. 8, and the bushing is pressed lightly against the surface of a polishing medium such as a polishing paper 81. The bushing is then moved over the surface of the polishing paper, for example, in a figure-eight pattern, for a period of time to polish the end face 26 of the optical fiber.

It should be noted that when the bushing is pressed against the polishing paper, the slightly protruding alignment ferrule will retract somewhat against the bias of the spring 36 such that the end face of the ferrule and the optical fiber therein will be substantially flush with the front surface 52 of the bushing during polishing.

Figure 9:
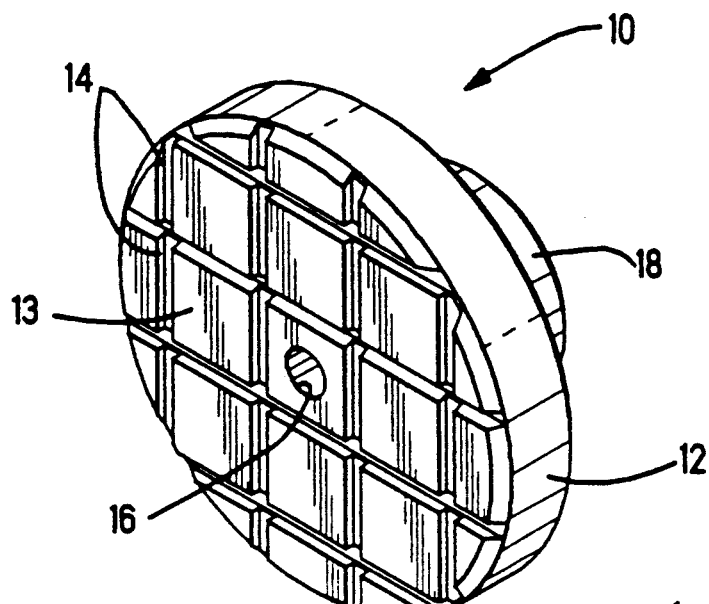
FIGS. 9 and 10 are front and rear perspective views, respectively, illustrating a prior art polishing bushing.
Figure 10:
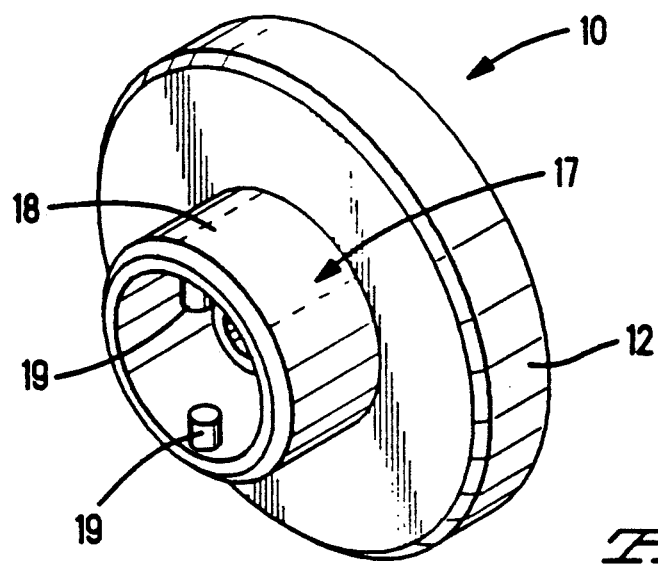

It should also be noted that the polishing bushing of the present invention is designed such that the alignment sleeve 63 thereof is adapted to be received within the outer sleeve portion 32 of the connector assembly (as shown in FIG. 6), and includes outwardly extending latching lugs 68 for engaging the latching slots 41 of the outer sleeve portion. This is distinguished from the prior art polishing bushing illustrated in FIGS. 9 and 10 in which the alignment sleeve 18 is adapted to extend around the outer sleeve portion of the connector assembly and includes inwardly extending latching lugs 19. The design of the present invention permits the operator to grasp the polishing tool more comfortably and securely during the polishing operation.

In addition, the polishing bushing is formed with a plurality of spaced ribs 82 which extend rearwardly from the spoke portions 57 of the disk-shaped body portion 51. As shown in FIG. 8, the finger and thumb can be placed between the ribs when the sleeve is grasped to more securely hold the bushing and help prevent the bushing from being twisted during the polishing operation. A plurality of raised ribs 83 on the outer surface of the outer sleeve portion 32 of the connector assembly provide a roughened surface area to also assist in providing a secure grip of the sleeve.

As indicated above, openings 61 in the polishing bushing permit effective visual monitoring of the progress of the polishing operation without having to remove the bushing from the polishing paper. For example, polishing marks formed on the polishing paper can readily be viewed through the openings during polishing. This can assist the operator, for example, in detecting when it is time to change to a finer grit polishing paper.

Also, the openings have the effect of reducing the overall weight of the bushing for greater comfort, and reduces the front surface area of the bushing, which improves the removal of debris, provides for a better distribution of polishing liquid thereunder, and should result in greater polishing speed. The reduced weight of the bushing together with the ability to better grasp the bushing and connector mounted thereto also allows the operator a greater sensitivity of feel during the polishing operation.

After a polishing operation has been completed, the connector assembly can be easily removed from the bushing by reversing the attaching procedure described above, and a new connector assembly can be quickly attached for a subsequent polishing operation. Preferably, the polishing bushing comprises a one-piece metal bushing and, most preferably, comprises an injection powder-molded metal bushing that can be manufactured easily and in a cost effective manner.

Although the polishing bushing described herein is designed for use in polishing bayonet lock type connectors, it should be understood that the invention is not so limited inasmuch as the bushing can readily be modified to receive connectors having other configurations. Also, the openings in the bushing can be configured in different ways. Thus, while what has been described constitutes a presently preferred embodiment of the invention, it should be understood that the invention could take numerous other forms; and, accordingly, it should be recognized that the invention is to be limited only insofar as is required by the scope of the following claims.

We claim

1. A polishing bushing for polishing an end face of an optical fiber supported in an optical fiber alignment ferrule, comprising:
- a body member having a front surface and a rear surface and a central bore extending therethrough in which an end of the alignment ferrule is to be disposed; and
- securing means for securing the ferrule to the body member for maintaining an end face of the ferrule and the end face of the optical fiber supported therein to be polished proximate the front surface of the body member, wherein said body member includes a plurality of spaced openings surrounding said bore, each of said openings extending therethrough from the front surface to the rear surface thereof to permit visual monitoring of a polishing operation therethrough.

2. A polishing bushing for polishing an end face of an optical fiber supported in an optical fiber alignment ferrule, comprising:
a body member having a flat front surface and a rear surface and including an outer ring portion, a central hub portion having an bore extending therethrough in which an end of the alignment ferrule is to be disposed, and a spoke portion connecting said ring portion and said hub portion and defining an opening therebetween to permit visual monitoring of a polishing operation therethrough; and
securing means for securing the body member to the optical fiber alignment ferrule for maintaining an end face of the ferrule and the end face of the optical fiber supported therein to be polished proximate the front surface of the body member.

3. The polishing bushing of claim 1, wherein said body member comprises a disk-shaped member having an outer ring portion, a central hub portion through which said bore extends, and a plurality of radial spoke portions connecting said outer ring portion and said hub portion, and wherein said plurality of openings comprise a plurality of arcuate openings defined between said plurality of spoke portions.

4. The polishing bushing of claim 3 and further including a plurality of grooves provided in the front surface of said disk-shaped body portion for assisting in the removal of debris generated during a polishing operation.

5. The polishing bushing of claim 4 wherein said plurality of grooves are provided in the front surface of said outer ring portion and of said plurality of spoke portions.

6. The polishing bushing of claim 1 wherein said securing means includes an alignment sleeve extending rearwardly from the back surface of said body portion and in alignment with said bore for securing an optical fiber connector containing said alignment ferrule to said bushing.

7. The polishing bushing of claim 6 wherein said alignment sleeve includes bayonet lock type latching means for mating with a bayonet lock type connector.

8. The polishing bushing of claim 7 wherein said alignment sleeve includes a pair of latching lugs extending outwardly from a side surface thereof for engaging latching slots in a sleeve of said bayonet lock type connector whereby said connector sleeve extends around said alignment sleeve when said connector is secured to said bushing.

9. The polishing bushing of claim 1 and further including a plurality of spaced raised ribs extending rearwardly from the rear surface of said body member to provide an operator with a comfortable and secure grip of said bushing.

10. The polishing bushing of claim 1 wherein said bushing comprises a one-piece molded metal bushing.

11. A polishing bushing for polishing an end face of an optical fiber supported in an optical fiber alignment ferrule of an optical fiber connector, comprising:
a body member having a flat front surface and a rear surface and including an annular outer ring portion, a central hub portion having a bore extending therethrough, in which an end of the alignment ferrule is to be disposed, and a plurality of radial spoke portions connecting said ring portion and said hub portion and defining a plurality of arcuate-shaped openings therebetween to permit visual monitoring of a polishing operation therethrough; and
securing means for securing the body member to the optical fiber connector for maintaining an end face of the ferrule and the end face of the optical fiber supported therein to be polished proximate the front surface of the body member.

12. The polishing bushing of claim 11 wherein said securing means comprises bayonet lock type securing means for mating with a bayonet lock type connector.

13. The polishing bushing of claim 12 wherein said bayonet lock type securing means comprises an annular alignment sleeve extending rearwardly from the rear surface of said hub portion and a pair of diametrically opposed latching lugs extending outwardly from an outer surface of said alignment sleeve for engaging latching slots on said bayonet lock type connector.

14. The polishing bushing of claim 11 and further including a plurality of spaced raised ribs extending rearwardly from the rear surface of said plurality of spoke portions to provide an operator with a comfortable and secure grip of said bushing.

* * * * *